US012410546B2

(12) United States Patent
Sasaki et al.

(10) Patent No.: US 12,410,546 B2
(45) Date of Patent: Sep. 9, 2025

(54) PREDICTION METHOD, RECORDING MEDIUM, PREDICTION SYSTEM, SERVER, AND DISPLAY DEVICE

(71) Applicant: Panasonic Intellectual Property Management Co., Ltd., Osaka (JP)

(72) Inventors: Chieko Sasaki, Osaka (JP); Tatsuro Yamada, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 764 days.

(21) Appl. No.: 17/776,895

(22) PCT Filed: Jun. 17, 2021

(86) PCT No.: PCT/JP2021/023107
§ 371 (c)(1),
(2) Date: May 13, 2022

(87) PCT Pub. No.: WO2022/180878
PCT Pub. Date: Sep. 1, 2022

(65) Prior Publication Data
US 2023/0160126 A1 May 25, 2023

(30) Foreign Application Priority Data
Feb. 25, 2021 (JP) ................. 2021-028845

(51) Int. Cl.
*D06F 33/70* (2020.01)
*D06F 25/00* (2006.01)
(Continued)

(52) U.S. Cl.
CPC .............. *D06F 33/70* (2020.02); *D06F 25/00* (2013.01); *D06F 33/68* (2020.02); *D06F 34/04* (2020.02);
(Continued)

(58) Field of Classification Search
CPC .......... D06F 33/70; D06F 33/68; D06F 34/04; D06F 34/26; D06F 34/28; D06F 25/00;
(Continued)

(56) References Cited

U.S. PATENT DOCUMENTS 5,806,204 A * 9/1998 Hoffman ................. D06F 58/24
34/605
6,122,840 A * 9/2000 Chbat ..................... D06F 58/46
34/535
(Continued)

FOREIGN PATENT DOCUMENTS

CN 115244242 A * 10/2022 ............. D06F 25/00
JP H11-146999 A 6/1999
(Continued)

OTHER PUBLICATIONS

International Search Report issued in corresponding International Application No. PCT/JP2021/023107, dated Aug. 17, 2021.

*Primary Examiner* — Stephen M Gravini
(74) *Attorney, Agent, or Firm* — Rimon P.C.

(57) ABSTRACT

A prediction method includes acquisition step, prediction step, determination step, and processing step. In acquisition step, parameters for a drying operation are acquired. In prediction step, based on the acquired parameters, a drying time required for the drying operation is predicted by a first prediction method. In determination step, when the restart of the drying operation is detected while the drying operation is stopped, whether the first prediction method performed in prediction step is applicable is determined. In processing step, when the first prediction method is determined to be applicable, the first prediction method is continued and when the first prediction method is determined not to be applicable, predetermined processing is performed.

13 Claims, 5 Drawing Sheets

(51) Int. Cl.
   *D06F 33/68* (2020.01)
   *D06F 34/04* (2020.01)
   *D06F 34/26* (2020.01)
   *D06F 34/28* (2020.01)
   *D06F 103/32* (2020.01)
   *D06F 103/68* (2020.01)
   *D06F 105/56* (2020.01)
   *D06F 105/58* (2020.01)
   *G06N 5/022* (2023.01)

(52) U.S. Cl.
   CPC ............ *D06F 34/26* (2020.02); *D06F 34/28* (2020.02); *G06N 5/022* (2013.01); *D06F 2103/32* (2020.02); *D06F 2103/68* (2020.02); *D06F 2105/56* (2020.02); *D06F 2105/58* (2020.02)

(58) Field of Classification Search
   CPC ............ D06F 2103/32; D06F 2103/68; D06F 2105/58; G06N 5/022
   USPC .......................................... 34/427, 595–610
   See application file for complete search history.

(56) References Cited

U.S. PATENT DOCUMENTS

| | | | |
|---|---|---|---|
| 8,627,581 B2* | 1/2014 | Brown | D06F 58/20 34/607 |
| 8,800,164 B2* | 8/2014 | Kim | D06F 33/50 137/597 |
| 9,395,709 B2* | 7/2016 | Ozawa | G05B 15/02 |
| 10,799,180 B2* | 10/2020 | Gunasekar | A61B 5/291 |
| 11,153,113 B2* | 10/2021 | Khalid | H04L 12/2818 |
| 11,255,042 B2* | 2/2022 | Choung | H04W 72/21 |
| 11,359,861 B2* | 6/2022 | Ganguly | F26B 25/22 |
| 11,686,041 B2* | 6/2023 | Del Maschio | D06F 58/38 34/595 |
| 12,116,718 B2* | 10/2024 | Kessler | A47L 15/0034 |
| 2023/0151524 A1* | 5/2023 | Yamada | D06F 58/38 34/427 |
| 2023/0160126 A1* | 5/2023 | Sasaki | D06F 25/00 34/427 |

FOREIGN PATENT DOCUMENTS

| | | | | |
|---|---|---|---|---|
| JP | 2019-187613 A | | 10/2019 | |
| JP | 7486083 B2 * | | 5/2024 | ............ D06F 25/00 |
| WO | WO-2022180878 A1 * | | 9/2022 | ............ D06F 25/00 |

* cited by examiner

PREDICTION METHOD, RECORDING MEDIUM, PREDICTION SYSTEM, SERVER, AND DISPLAY DEVICE

TECHNICAL FIELD

The present disclosure relates to a prediction method for predicting a drying time required for a clothes drying operation, a recording medium, a prediction system, a server, and a display device.

BACKGROUND ART

Patent Literature (PTL) 1 discloses a drum-type washer and dryer. The drum-type washer and dryer includes: a weight measuring device which measures weight information of laundry; a storage device which stores the weight information; and a control device which includes a comparison-computation device for using the weight information to perform comparison and computation. The drum-type washer and dryer uses the remaining time in a drying step which is predicted from the change of the weight of the laundry with time in the drying step, and thereby determines the completion of the drying step.

CITATION LIST

Patent Literature

[PTL 1] Japanese Unexamined Patent Application Publication No. 11-146999

SUMMARY OF INVENTION

Technical Problem

The present disclosure provides a prediction method and the like which easily continue, even when a drying operation is stopped during operation, a normal method for predicting a drying time.

Solution to Problem

A prediction method according to an aspect of the present disclosure includes an acquiring step, a predicting step, a determining step, and a continuing/performing step. In the acquiring step, parameters for a drying operation performed by a drying function-equipped washer are acquired. In the predicting step, a drying time required for the drying operation is predicted by a first prediction method based on the parameters acquired in the acquiring step. In the determining step, when a restart of the drying operation is detected while the drying operation is stopped, whether the first prediction method performed in the predicting step is applicable is determined. In the continuing/performing step, the first prediction method is continued when the first prediction method is determined to be applicable and predetermined processing is performed when the first prediction method is determined not to be applicable.

A prediction method according to an aspect of the present disclosure includes, a predicting step, a determining step, and a continuing/performing step. In the predicting step, a drying time required for the drying operation is predicted by a first prediction method based on parameters for a drying operation. In the determining step, when a restart of the drying operation is detected while the drying operation is stopped, whether the first prediction method performed in the predicting step is applicable is determined. In the continuing/performing step, the first prediction method is continued when the first prediction method is determined to be applicable and predetermined processing is performed when the first prediction method is determined not to be applicable.

A recording medium, according to an aspect of the present disclosure is a non-transitory computer-readable recording medium having a program recorded thereon for causing one or more processors to execute the prediction method described above.

A prediction system according to an aspect of the present disclosure includes an acquirer, a predictor, a determiner, and a processor. The acquirer acquires parameters for a drying operation performed by a drying function-equipped washer. The predictor predicts, by a first prediction method, a drying time required for the drying operation based on the parameters acquired by the acquirer. The determiner determines, when a restart of the drying operation is detected while the drying operation is stopped, whether the first prediction method performed by the predictor is applicable. The processor continues the first prediction method when the first prediction method is determined to be applicable and performs predetermined processing when the first prediction method is determined not to be applicable.

A server according to an aspect of the present disclosure includes the prediction system described above. The prediction system communicates with the drying function-equipped washer via an external network.

A display device according to an aspect of the present disclosure includes a communication function and a display function. The communication function is a function of communicating with the prediction system described above. The display function is a function of displaying, when receiving, using the communication function, information on a result of performing the predetermined processing from the prediction system, the information to present the information to a user.

Advantageous Effects of Invention

In a prediction method and the like according to the present disclosure, it is advantageous to easily continue, even when a drying operation is stopped during operation, a normal method for predicting a drying time.

DESCRIPTION OF EMBODIMENTS

Findings Underlying Present Disclosure

The inventor's point of view will first be described below.

For example, as with the drum-type washer and dryer disclosed in PTL 1, a drying function-equipped washer has the function of performing a drying operation for drying washed clothes. The drying function-equipped washer also has the function of predicting a drying time required for the drying operation and displaying, on a display, the predicted drying time as the remaining time until completion of the drying operation. Since a user sees the remaining time displayed on the display to be able to grasp an approximate completion time of the drying operation, the user can make a plan with consideration given to the time described above.

Incidentally, it is likely that partway through the drying operation, for example, the user temporarily stops the drying operation in order to check how the clothes are dried or put additional clothes. However, since the function of predicting the drying time described above does not assume a temporary stop, when the drying operation is restarted after the temporary stop is released, there is a question of whether to restart the normal function of predicting the drying time.

Here, when the drying operation is restarted, if the normal function of predicting the drying time is restarted without exception, the accuracy of the prediction of the drying time is lowered, with the result that the accuracy of the remaining time until completion of the drying operation may be lowered. In this case, the drying operation is actually completed before or after the elapse of the remaining time, and thus, for example, the user may feel uncomfortable such that the convenience of the user is lowered. On the other hand, when the drying operation is restarted, if the function of predicting the drying time is stopped without exception, the user cannot grasp the remaining time until completion of the drying operation, with the result that the convenience of the user may be lowered.

In view of the foregoing, the inventor has completed the present disclosure.

An embodiment will be described in detail below with reference to drawings as necessary. However, a detailed description beyond necessity may be omitted. For example, a detailed description of an already well known matter or a repeated description of substantially the same configuration may be omitted. This is intended for preventing the following description from being unnecessarily redundant and facilitating the understanding of a person skilled in the art.

The inventor provides accompanying drawings and the following description so that the person skilled in the art fully understands the present disclosure, and they do not intend to limit the scope of claims.

EMBODIMENT

1-1. Overall Configuration

Figure 1:
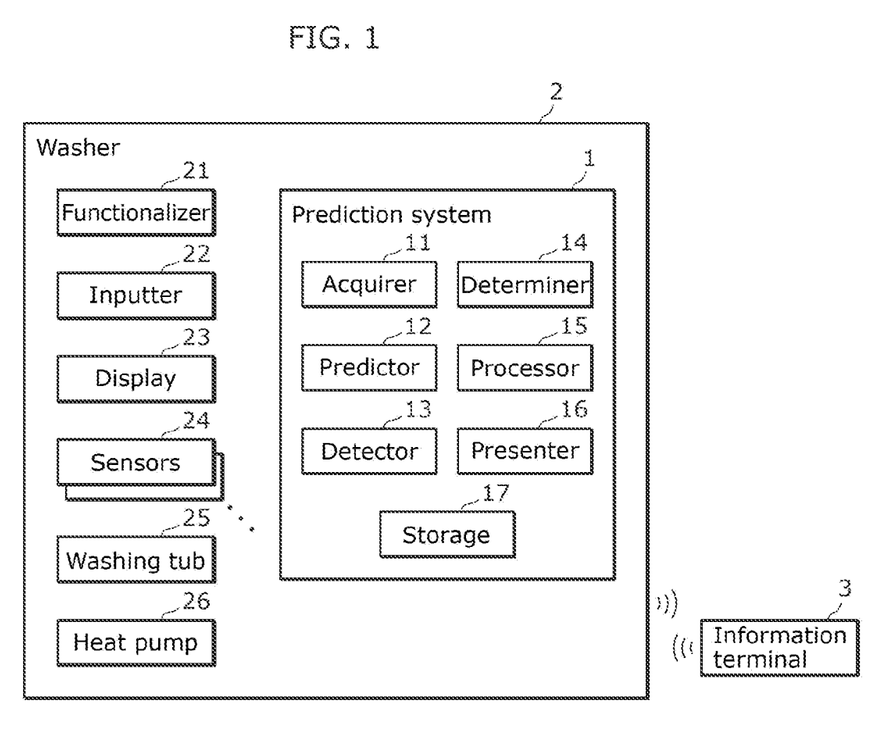
FIG. 1 is a block diagram showing the configuration of a drying function-equipped washer incorporating a prediction system in an embodiment.

An overall configuration including prediction system 1 in the embodiment will first be described with reference to FIG. 1. FIG. 1 is a block diagram showing the configuration of drying function-equipped washer 2 (hereinafter simply referred to as "washer 2" unless otherwise specified) which incorporates prediction system 1 in the embodiment. In the embodiment, washer 2 incorporates prediction system 1.

Washer 2 includes functionalizer 21, inputter 22, display 23, one or more sensors 24, washing tub 25, and heat pump 26. Washer 2 further includes prediction system 1. In the embodiment, washer 2 is a drum-type washer which serves as an example. Washer 2 may naturally be, for example, a vertical washer or the like without being limited to the drum-type washer.

Functionalizer 21 performs various types of functions included in washer 2. In the embodiment, functionalizer 21 includes a washing function of performing a washing operation for washing clothes stored in washing tub 25 and a drying function of performing a drying operation for drying the clothes stored and washed in washing tub 25. In the washing operation, for example, washing tub 25 is rotated to perform washing, rinsing, and/or dehydrating, and the like on the clothes stored in washing tub 25 so as to wash the clothes. In the drying operation, for example, dry air dehumidified by heat pump 26 is fed to dry the clothes stored and washed in washing tub 25.

Functionalizer 21 further includes a display function of displaying, on display 23, a prediction time for a washing time (that is, the remaining time until completion of the washing operation) required for the washing operation and a prediction time for a drying time (that is, the remaining time until completion of the drying operation) required for the drying operation. In the embodiment, the prediction time for the drying time is predicted by prediction system 1. Although the prediction time for the washing time is predicted by prediction system 1 or a system other than prediction system 1, the description thereof is omitted here.

Functionalizer 21 performs a function corresponding to an input received by inputter 22. For example, functionalizer 21 may communicate with information terminal 3 possessed by the user to perform a function corresponding to an input of the user received in information terminal 3. Examples of information terminal 3 can include a smartphone, a tablet terminal, a desktop or laptop personal computer, and the like. Communication between information terminal 3 and washer 2 is, for example, wireless communication in accordance with standards such as WiFi (registered trademark) or Bluetooth (registered trademark) Low Energy (BLE). The standards for the communication between information terminal 3 and washer 2 are not particularly limited.

Inputter 22 receives an input which is made by an operation of the user. Inputter 22 is formed with, for example, push buttons and the like for receiving various types of inputs. Inputter 22 receives, for example, inputs such as an input for selecting an operation to be performed by functionalizer 21, an input for selecting the details of an operation (for example, an operation mode), an input for starting an operation, and an input for temporarily stopping an operation. When display 23 is formed with a touch panel display, display 23 may also serve as part of inputter 22.

Display 23 is, for example, a liquid crystal display, and displays various types of information on washer 2. For example, during the washing operation, display 23 displays a character string and/or an image indicating that the washing operation is being performed, a character string indicating the prediction time for the washing time and the like. For example, during the drying operation, display 23 displays a character string and/or an image indicating that the drying operation is being performed, a character string indicating the prediction time for the drying time and the like. Display 23 may include, in addition to the liquid crystal display, a lamp which turns on or off according to the information.

Sensors 24 detect various states on the operations of washer 2. In other words, sensors 24 detect parameters for the operations of washer 2. For example, one or more sensors 24 include a weight sensor or the like which detects the weight of clothes stored in washing tub 25. One or more sensors 24 mainly include sensors for detecting states on the washing operation and sensors for detecting states on the drying operation. The description of the sensors for detecting the states on the washing operation is omitted here.

In the embodiment, one or more sensors 24 include at least a first temperature sensor for detecting a suction temperature and a second temperature sensor for detecting a discharge temperature. Each of the first temperature sensor and the second temperature sensor is formed with a thermistor. The first temperature sensor is installed in the vicinity of, for example, the intake port of heat pump 26. The second temperature sensor is installed in the vicinity of, for example, the exhaust port of heat pump 26. Here, the "suction temperature" refers to the temperature of air sucked from washing tub 25 into heat pump 26. The "discharge temperature" refers to the temperature of air exhausted from heat pump 26 to washing tub 25.

1-2. Prediction System

The details of prediction system 1 will then be described. As shown in FIG. 1, prediction system 1 includes acquirer 11, predictor 12, detector 13, determiner 14, processor 15, presenter 16, and storage 17. In the embodiment, prediction system 1 preferably includes at least acquirer 11, predictor 12, determiner 14, and processor 15, and does not need to include detector 13, presenter 16, and storage 17.

Acquirer 11 acquires parameters for the drying operation performed by washer 2. Acquirer 11 is the main constituent which performs acquisition step ST1 in a prediction method. In the embodiment, acquirer 11 periodically acquires the results of detection of sensors 24 (that is, the parameters for the drying operation) until completion of the drying operation after the start of the drying operation.

Here, as has already been described, one or more sensors 24 include the first temperature sensor and the second temperature sensor. Hence, acquirer 11 acquires the suction temperature and the discharge temperature as the parameters for the drying operation. In other words, washer 2 has the function of using heat pump 26 to perform the drying operation. The parameters (for the drying operation) include the temperature of the air sucked from washing tub 25 into heat pump 26 in washer 2 and the temperature of the air exhausted from heat pump 26 to washing tub 25.

In the embodiment, acquirer 11 acquires, in addition to the suction temperature and the discharge temperature, information on the operation mode of the drying operation and the history information of the drying operation (including, for example, times actually taken for several tens of drying operations which have been performed most recently). The information on the operation mode of the drying operation can be acquired by acquiring an input which is received in inputter 22 or information terminal 3 to provide an instruction to perform the operation mode. The history information of the drying operation can be acquired by being read from storage 17.

Predictor 12 predicts, by a first prediction method, the drying time required for the drying operation based on the parameters acquired by acquirer 11 (acquisition step ST1). Predictor 12 is the main constituent which performs prediction step ST2 in the prediction method. Here, as the method for predicting the drying time required for the drying operation, for example, the first prediction method using a learned model and a rule-based second prediction method are present. In the embodiment, predictor 12 basically uses the first prediction method to predict the drying time. In other words, the method for using the first prediction method to predict the drying time corresponds to a normal method for predicting the drying time.

In the first prediction method, a machine-learned model for predicting the drying time is used to predict the drying time. The learned model is formed with, for example, a neural network having a multilayer structure, and is a model in which machine learning is completed such that, when the parameters for the drying operation are input, the prediction time for the drying operation is output. In other words, in the first prediction method, the parameters acquired by acquirer 11 are input to the learned model, and thus the prediction time for the drying time output from the learned model is obtained. In the first prediction method, the parameters (for example, the suction temperature and the discharge temperature) periodically acquired by acquirer 11 are input to the learned model, and thus the prediction time for the drying time is periodically obtained. In other words, during the drying operation, the prediction time for the drying time is periodically updated.

The parameters for the drying operation can include, for example, the suction temperature, the discharge temperature, the operation mode of the drying operation, and/or the history of the drying operation, and the like. The history of the drying operation is, for example, typical values of times actually taken for several tens of drying operations which have been performed most recently. The typical values can include, for example, an average value, a median value, a mode value, and the like. In the embodiment, all the parameters listed above are input to the learned model.

For example, in the learned model, machine learning is performed by supervised learning using a large number of learning data sets. Each of the learning data sets includes information indicating the parameters for the drying operation serving as input data and information indicating the drying time actually taken which serves as correct answer data. In the embodiment, the parameters for the drying operation included in each of the learning data sets are the parameters listed above.

In the second prediction method, mainly based on the suction temperature and the discharge temperature, the drying time is predicted on a rule base. Specifically, in the second prediction method, the moving average value of a difference between the suction temperature and the discharge temperature is monitored periodically (for example, at intervals of 30 to 60 minutes) for a certain period of time (for example, several minutes). The amount of change in the moving average value for the certain period of time and a threshold value are compared, and thus the degree of dryness of clothes is determined. Then, the prediction time for the drying time is obtained according to the degree of dryness of clothes. In other words, in the second prediction method, as in the first prediction method, during the drying operation, the prediction time for the drying time is periodically updated based on the suction temperature and the discharge temperature periodically acquired.

Figure 2:
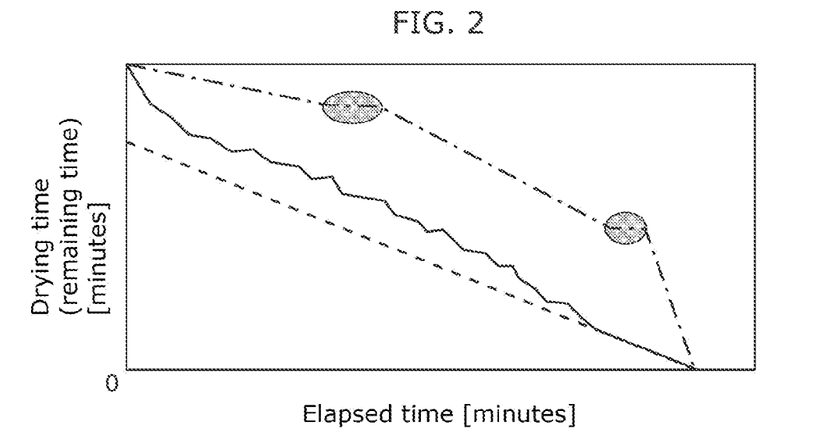
FIG. 2 is a comparison view of a first prediction method and a second prediction method for predicting a drying time.

FIG. 2 is a comparison view of the first prediction method and the second prediction method for predicting the drying time. In FIG. 2, the vertical axis represents the drying time (the remaining time), and the horizontal axis represents a time which has elapsed since the start of the drying operation. In FIG. 2, a solid line represents the drying time predicted by the first prediction method, an alternate long and short dashed line represents the drying time predicted by the second prediction method, and a broken lime represents an actual drying time. In FIG. 2, bent parts of the solid line represent timing for updating the prediction time for the drying time by the first prediction method. In FIG. 2, circle marks in the alternate long and short dashed line represent timing for updating the prediction time for the drying time by the second prediction method.

As shown in FIG. 2, in the second prediction method, the prediction time for the drying time relatively greatly differs from the actual drying time, and when the prediction time for the drying time is updated, the prediction time for the drying time tends to vary widely. On the other hand, in the first prediction method, the prediction time for the drying time does not significantly differ from the actual drying time and follows the actual drying time, and when the prediction time for the drying time is updated, the prediction time for the drying time does not vary widely. As described above, although this tendency depends on the degree of learning of the learned model, the accuracy of the prediction of the drying time in the first prediction method is basically higher than in the second prediction method.

Detector 13 (detection step ST3) detects the stop of the drying operation during operation and the restart of the drying operation. Detector 13 is the main constituent which performs detection step ST3 in the prediction method. In the embodiment, detector 13 acquires, during the drying operation, an input which is received in inputter 22 or information terminal 3 to provide an instruction to stop the drying operation during operation, and thereby detects the stop of the drying operation during operation. Detector 13 acquires, while the drying operation is stopped, an input which is received in inputter 22 or information terminal 3 to provide an instruction to restart the drying operation, and thereby detects the restart of the drying operation.

When detector 13 (detection step ST3) detects the restart of the drying operation, determiner 14 (determination step ST4) determines whether the first prediction method performed by predictor 12 (prediction step ST2) is applicable. Determiner 14 is the main constituent which performs determination step ST4 in the prediction method.

Here, when the drying operation is temporarily stopped during the drying operation, it is likely that when the drying operation is restarted, the internal environment of washing tub 25 is greatly changed as compared with the time when the drying operation is temporarily stopped. For example, when the drying operation is temporarily stopped, heat pump 26 is also temporarily stopped, and thus the internal temperatures of washing tub 25 such as the suction temperature and the discharge temperature are lowered or varied. When the drying operation is temporarily stopped, the lid of washing tub 25 is opened by the user, and thus the internal temperatures of washing tub 25 are lowered or varied. Furthermore, as a period during which the drying operation is temporarily stopped is increased, the internal environment of washing tub 25 is inevitably changed significantly.

Figure 3:
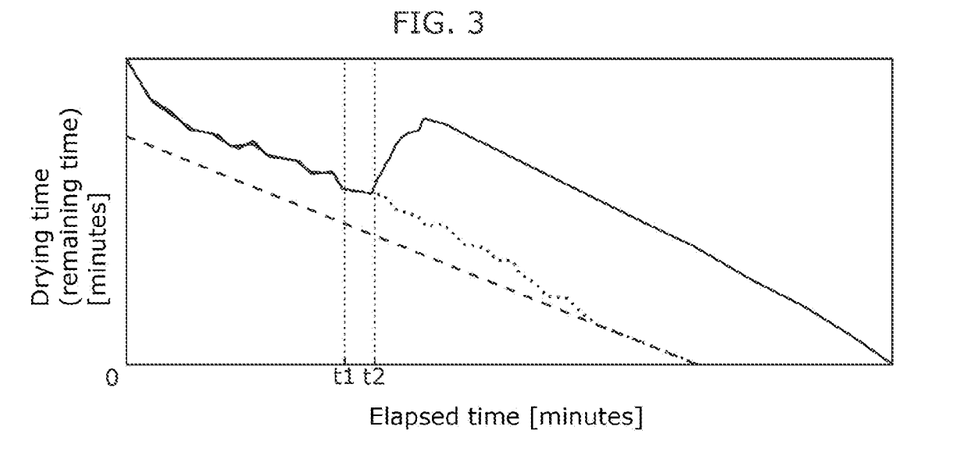
FIG. 3 is an illustrative view of a problem when a drying operation is stopped during operation in the prediction system of a comparison example.

When as described above, the internal environment of washing tub 25 is changed in a period until the drying operation is restarted after the drying operation is temporarily stopped, the accuracy of the prediction of the drying time after the restart of the drying operation may be disadvantageously lowered. This problem will be described below with reference to FIG. 3. FIG. 3 is an illustrative view of the problem when the drying operation is temporarily stopped during operation in the prediction system of a comparison example. The prediction system of the comparison example differs from prediction system 1 of the embodiment in that the prediction system of the comparison example does not include determiner 14. In FIG. 3, the vertical axis represents the drying time (the remaining time), and the horizontal axis represents a time which has elapsed since the start of the drying operation. In FIG. 3, a solid line represents a drying time predicted by the first prediction method, and a broken lime represents an actual drying time. Furthermore, in FIG. 3, a dotted line represents a drying time predicted by the first prediction method on the assumption that the drying operation is not temporarily stopped.

In an example shown in FIG. 3, the drying operation is temporarily stopped at time t1, and the drying operation is restarted at time t2. In the example shown in FIG. 3, when the drying operation is restarted at time t2 in the prediction system of the comparison example, the prediction of the drying time by the predictor is restarted. Although in this case, the predictor restarts the prediction of the drying time based on parameters at time 2, consideration is not given to a change in the internal environment of washing tub 25 in a period until the drying operation is restarted after the drying operation is temporarily stopped. Hence, in the example shown in FIG. 3, the prediction time for the drying time after time t2 greatly differs from the actual drying time in the case where the drying operation is not temporarily stopped, with the result that the accuracy of the prediction of the drying time is lowered.

Hence, in the embodiment, based on whether the history of the parameters before the drying operation is stopped includes parameters that are similar to the parameters for the restart of the drying operation, determiner 14 (determination step ST4) determines whether the first prediction method performed by predictor 12 (prediction step ST2) is applicable. In other words, in the embodiment, by whether the internal environment of washing tub 25 when the drying operation is restarted is similar to the internal environment of washing tub 25 before the drying operation is temporarily stopped, determiner 14 determines whether the first prediction method performed by predictor 12 is applicable after the restart of the drying operation.

Specifically, when detector 13 detects the restart of the drying operation, determiner 14 causes acquirer 11 to sequentially acquire the parameters for the drying operation (here, the suction temperature and the discharge temperature) for a certain period of time after the restart of the drying operation. Then, determiner 14 reads, from storage 17, the history of the parameters for the drying operation before the drying operation is temporarily stopped, and compares the history with the result of the acquisition (that is, the suction temperature and the discharge temperature in the certain period of time). When the result of the acquisition in the certain period of time is included in the history or values obtained by adding allowable errors to the result of the acquisition are included in the history (that is, when parameters similar to the result of the acquisition are included in the history), determiner 14 determines that the first prediction method performed by predictor 12 is applicable after the restart of the drying operation. On the other hand, when this is not the case, determiner 14 determines that the first prediction method performed by predictor 12 is not applicable after the restart of the drying operation.

When determiner 14 (determination step ST4) determines that the first prediction method performed by predictor 12 (prediction step ST2) is applicable, processor 15 (processing step ST5) continues the first prediction method performed by predictor 12 and when determiner 14 (determination step ST4) determines that the first prediction method performed by predictor 12 is not applicable, processor 15 performs predetermined processing. Processor 15 is the main constituent which performs processing step ST5 in the prediction method.

Specifically, when determiner 14 determines that the first prediction method performed by predictor 12 is applicable, processor 15 causes predictor 12 to return to the time when the parameters in the history similar to the result of the acquisition are acquired to predict the drying time. On the other hand, when determiner 14 determines that the first prediction method performed by predictor 12 is not applicable, processor 15 causes predictor 12 to switch the prediction method used by predictor 12 from the first prediction method to the second prediction method. In this case, after the drying operation is restarted, predictor 12 predicts the drying time by the second prediction method. In other words, in the embodiment, the predetermined processing includes processing which switches from the first prediction method to the second prediction method different from the first prediction method to predict the drying time.

The predetermined processing is not limited to the processing which switches from the first prediction method to the second prediction method, and the predetermined processing may be other processing. For example, the predetermined processing may include, in addition to the processing which switches from the first prediction method to the second prediction method, processing which notifies, through presenter 16, the user that the accuracy of the prediction of the drying time after the restart of the drying operation is lowered. For example, the predetermined processing may also be processing which causes predictor 12 to maintain the prediction of the drying time performed by the first prediction method and which notifies, through presenter 16, the user that the accuracy of the prediction of the drying time after the restart of the drying operation is lowered.

Figure 4:
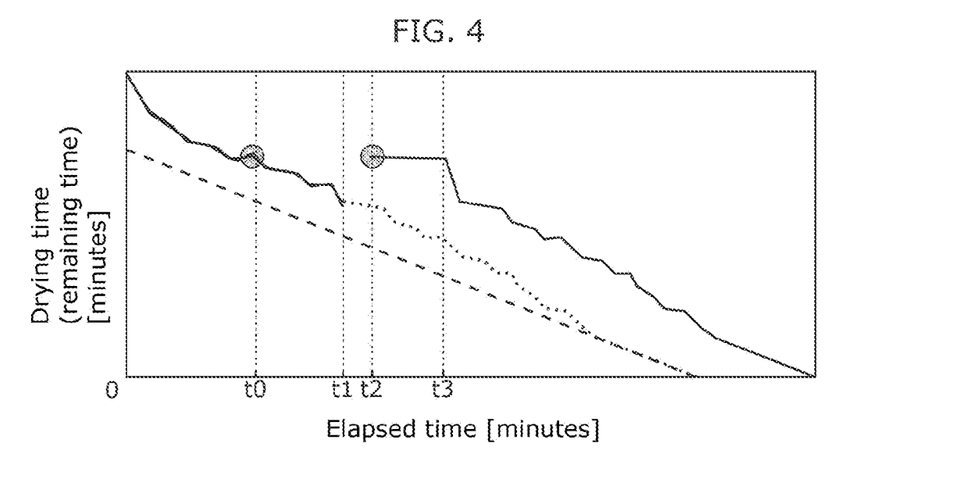
FIG. 4 is an illustrative view of an example of an operation performed by a determiner and a predictor in the prediction system of the embodiment.

An example of an operation performed by determiner 14 and predictor 12 will be described below with reference to FIG. 4. FIG. 4 is an illustrative view of the example of the operation performed by determiner 14 and predictor 12 in prediction system 1 of the embodiment. In FIG. 4, the vertical axis represents the drying time (the remaining time), and the horizontal axis represents a time which has elapsed since the start of the drying operation. In FIG. 4, a solid line represents a drying time predicted by the first prediction method, and a broken lime represents an actual drying time. Furthermore, in FIG. 4, a dotted line represents a drying time predicted by the first prediction method on the assumption that the drying operation is not temporarily stopped.

In an example shown in FIG. 4, the drying operation is temporarily stopped at time t1, and the drying operation is restarted at time t2. In the example shown in FIG. 4, in a certain period of time from time t2 to time t3, determiner 14 causes acquirer 11 to acquire parameters for the drying operation (here, the suction temperature and the discharge temperature). In the example shown in FIG. 4, the parameters for the drying operation at time t2 are similar to parameters for the drying operation at time t0 before the drying operation is temporarily stopped (see circle marks shown in FIG. 4). Hence, in the example shown in FIG. 4, determiner 14 determines that the first prediction method performed by predictor 12 is applicable after the restart of the drying operation. Then, in the example shown in FIG. 4, processor 15 causes predictor 12 to return to time t0 to predict the drying time, and reflects the result of the prediction on the drying time after time t3.

As described above, in the example shown in FIG. 4, even when the drying operation is temporarily stopped, the first prediction method performed by predictor 12 can be continued, with the result that it is possible to suppress a decrease in the accuracy of the prediction of the drying time after the restart of the drying operation.

Presenter 16 (presentation step ST6) presents, to the user of washer 2, information on the result of the performance by processor 15 (processing step ST5). Presenter 16 is the main constituent which performs presentation step ST6 in the prediction method. Here, the information on the result of the performance by processor 15 can include, for example, information indicating that the first prediction method performed by predictor 12 is continued after the restart of the drying operation, information indicating that the prediction of the drying time after the restart of the drying operation switches from the first prediction method to the second prediction method, and the like. The information on the result of the performance by processor 15 can also include information indicating that the accuracy of the prediction of the drying time after the restart of the drying operation is lowered.

In the embodiment, presenter 16 causes display 23 to display, with a character string and/or an image, the information on the result of the performance by processor 15, and thereby presents the information to the user. Presenter 16 may transmit the information on the result of the performance by processor 15 to information terminal 3 to display the information on the display of information terminal 3.

When display 23 includes a lamp, presenter 16 may present, to the user, by the status of turning on of the lamp, the information on the result of the performance by processor 15. In a specific example, it is assumed that the lamp of display 23 turns on during the prediction in the drying operation. It is also assumed that the information on the result of the performance by processor 15 is information indicating that the prediction of the drying time after the restart of the drying operation switches from the first prediction method to the second prediction method. In this case, for example, presenter 16 turns off the lamp and turns on another lamp, changes the color of light emitted by the lamp or blinks the lamp, and thereby presents the information to the user.

Presenter 16 may cause, for example, a speaker included in washer 2 to output a voice message to present the information on the result of the performance by processor 15 to the user. Presenter 16 may combine both display presentation and voice presentation to present the information on the result of the performance by processor 15 to the user.

Storage 17 is a storage device which stores information (such as computer programs) necessary for performing various types of functions by functionalizer 21 and the units of prediction system 1 in washer 2. Although storage 17 is realized by, for example, a semiconductor memory, storage 17 is not particularly limited, and a known means for electronic information storage can be used. Storage 17 stores, for example, the history information of the washing operation and the drying operation, the history information of the results of detection of sensors 24, and the like.

2. Operation

Figure 5:
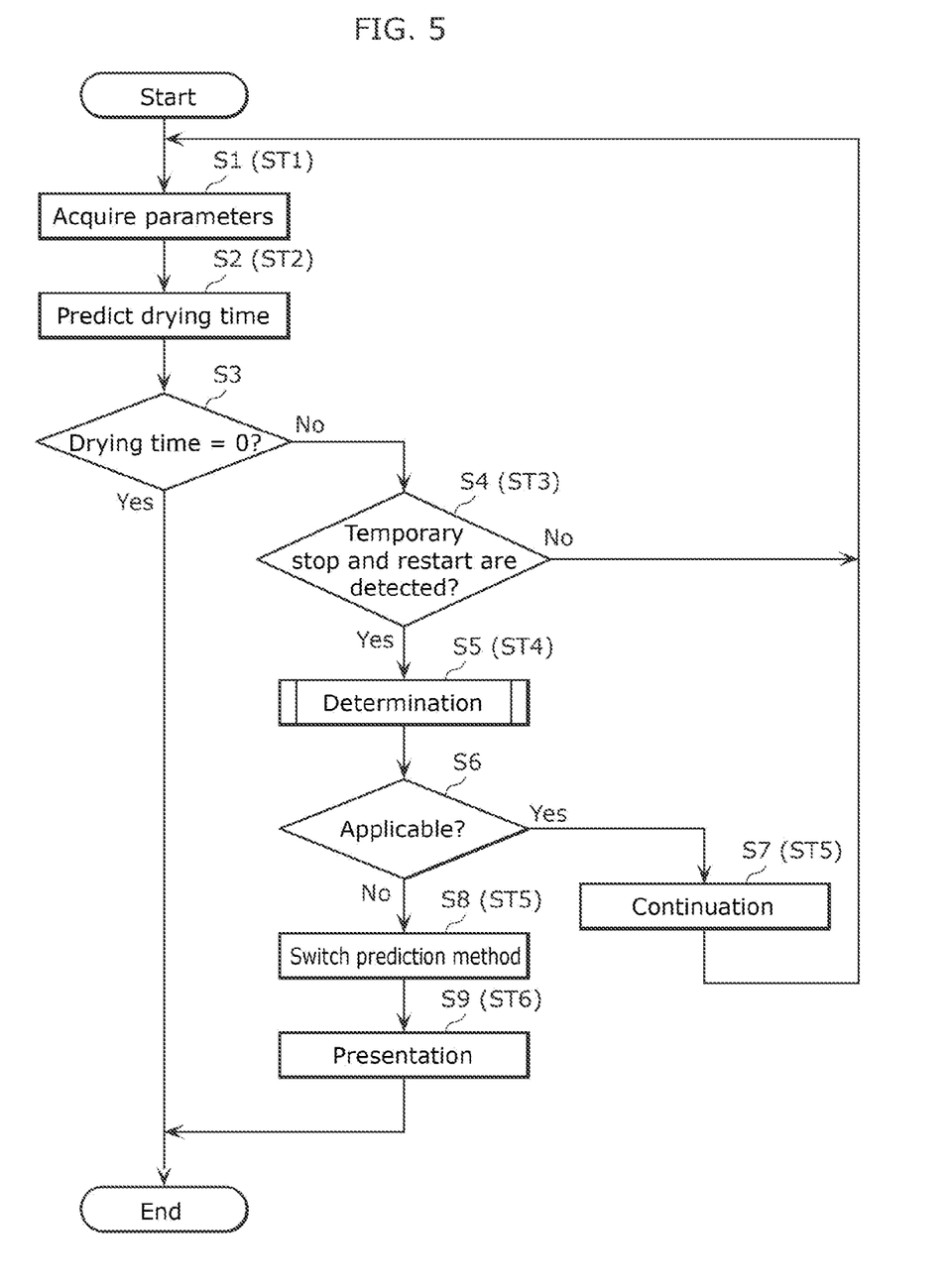
FIG. 5 is a flowchart showing an example of an operation performed by the prediction system in the embodiment.
Figure 6:
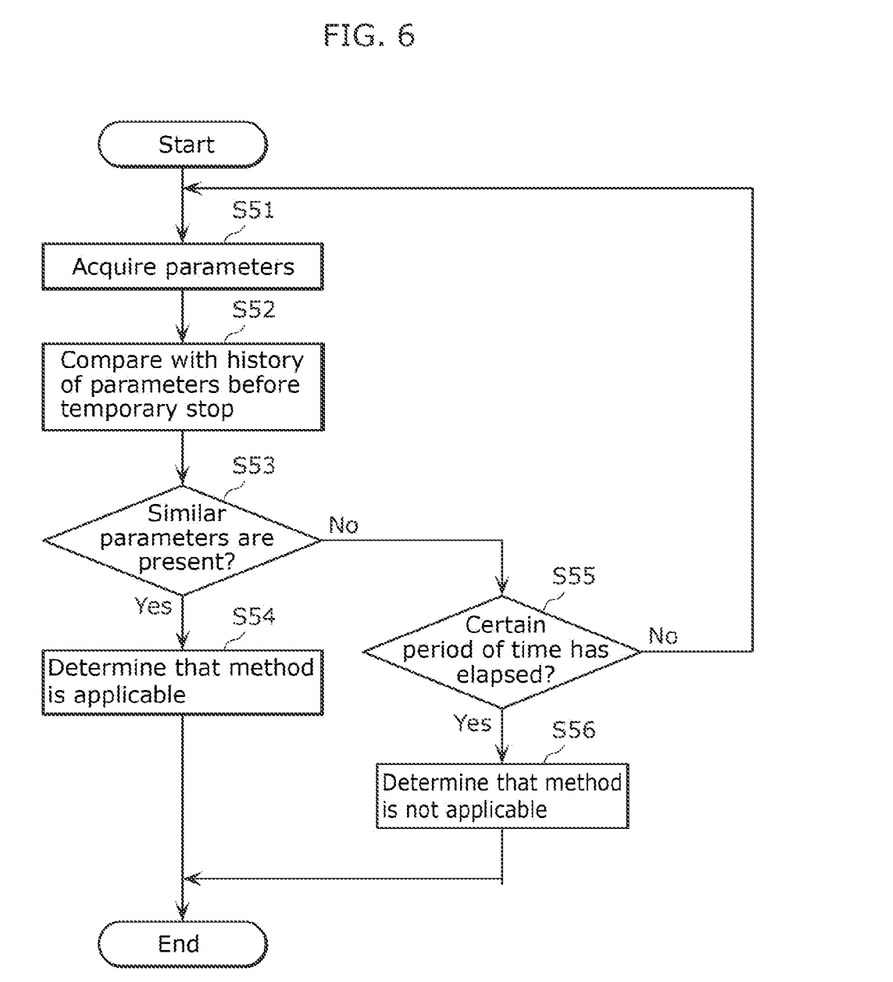
FIG. 6 is a flowchart showing an example of an operation performed by the determiner in the prediction system of the embodiment.

The operation of prediction system 1 configured as described above will be described below with reference to FIGS. 5 and 6. FIG. 5 is a flowchart showing an example of an operation performed by prediction system 1 in the embodiment. FIG. 6 is a flowchart showing an example of an operation performed by determiner 14 in prediction system 1 of the embodiment. In the following description, it is assumed that an operation input for providing an instruction to start the drying operation is received from the user and thus functionalizer 21 in washer 2 performs the drying operation.

Acquirer 11 first acquires parameters for a drying operation before the drying operation is performed (S1). Processing S1 corresponds to acquisition step ST1 in the prediction method. Then, predictor 12 predicts a drying time based on the parameters acquired by acquirer 11 (S2). Processing S2 corresponds to prediction step ST2 in the prediction method. A prediction time for the drying time is displayed on display 23. Thereafter, basically, until the drying time reaches zero (that is, the drying operation is completed) (S3: no, S4: no), processing S1 and processing S2 are repeated periodically, and thus the prediction time for the drying time is periodically updated and displayed on display 23. Then, when the drying time reaches zero (S3: yes), the operation of prediction system 1 is completed.

Here, during the drying operation (S3: no), detector 13 monitors whether the drying operation is temporarily stopped and is restated (S4). Processing S4 corresponds to detection step ST3 in the prediction method. Then, detector 13 detects that the drying operation is temporarily stopped and is restated (S4: yes), determiner 14 determines whether the first prediction method performed by predictor 12 is applicable after the restart of the drying operation (S5). Processing S5 corresponds to determination step ST4 in the prediction method. Processing S5 will be described later with reference to FIG. 6.

When determiner 14 determines that the first prediction method performed by predictor 12 is applicable (S6: yes), processor 15 continues the first prediction method performed by predictor 12 (S7). On the other hand, when determiner 14 determines that the first prediction method performed by predictor 12 is not applicable (S6: no), processor 15 switches the prediction method used by predictor 12 from the first prediction method to the second prediction method (S8). Processing S7 and processing S8 correspond to processing step ST5 in the prediction method. Then, for example, presenter 16 causes display 23 to display information on the result of the performance by processor 15 to present the information to the user (S9). Processing S9 corresponds to presentation step ST6 in the prediction method.

Processing S5, that is, the example of the operation of determiner 14 will then be described with reference to FIG. 6. Determiner 14 first causes acquirer 11 to acquire parameters for the drying operation for a certain period of time after the restart of the drying operation (S51). Then, determiner 14 reads, from storage 17, the history of parameters for the drying operation before the drying operation is temporarily stopped, and compares the history with the result of the acquisition (S52). When parameters similar to the result of the acquisition are included in the history (S53: yes), determiner 14 determines that the first prediction method performed by predictor 12 is applicable after the restart of the drying operation (S54). On the other hand, when parameters similar to the result of the acquisition are not included in the history (S53: no), determiner 14 repeats processing S51 to S53 until the certain period of time has elapsed (S55: no). Then, when the certain period of time has elapsed in a state where parameters similar to the result of the acquisition are not included in the history (S55: yes), determiner 14 determines that the first prediction method performed by predictor 12 is not applicable after the restart of the drying operation (S56).

3. Effects and the Like

Advantages of prediction system 1 in the embodiment will be described below.

As has already been described, in a case where the drying operation is stopped during operation partway through the drying operation, when the drying operation is restarted, the normal function of predicting the drying time is restarted without exception or is stopped without exception, with the result that in either case, the convenience of the user is disadvantageously lowered.

By contrast, in prediction system 1 of the embodiment, after the restart of the drying operation, whether the first prediction method performed by predictor 12 (that is, the normal method for predicting the drying time) is applicable is determined, and processing to be performed after the restart of the drying operation is determined according to the result of the determination. Hence, depending on the result of the determination, even when the drying operation is stopped during operation, the first prediction method performed by predictor 12 can be continued, with the result that it is possible to suppress a decrease in the accuracy of the prediction of the drying time after the restart of the drying operation. In other words, in prediction system 1 of the embodiment, even when the drying operation is stopped during operation, the processing after the restart of the drying operation is not determined without exception, and processing to be performed after the restart is determined according to the circumstances when the drying operation is restarted.

As described above, in prediction system 1 of the embodiment, it is advantageous to easily continue, even when the drying operation is stopped during operation, the normal method for predicting the drying time. In prediction system 1 of the embodiment, as compared with the case where, when the drying operation is restarted, the normal function of predicting the drying time is restarted without exception or is stopped without exception, it is advantageous that the convenience of the user is unlikely to be lowered.

4. Variations

As described above, as an example of the technology disclosed in the present application, the embodiment has been described. However, the technology in the present disclosure is not limited to the embodiment, and can be applied to embodiments obtained by performing change, replacement, addition, omission, and the like as necessary. The constituent elements described in the above embodiment can be combined to form new embodiments.

Hence, variations of the embodiment will be illustrated below.

Figure 7:
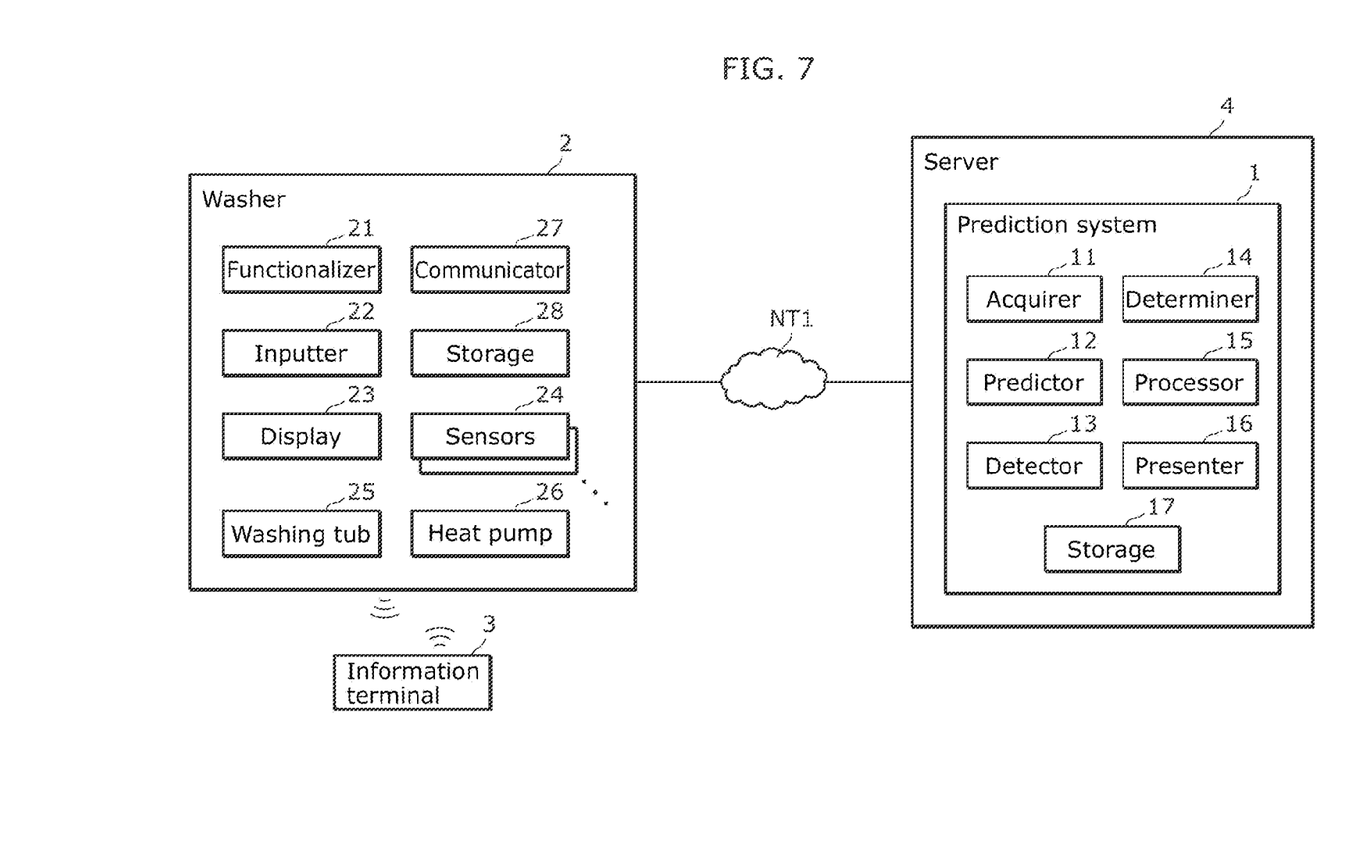
FIG. 7 is a block diagram showing an overall configuration including a prediction system in a variation of the embodiment.

Although in the embodiment described above, washer 2 incorporates prediction system 1, the present disclosure is not limited to this configuration. For example, prediction system 1 may be provided separately from washer 2. FIG. 7 is a block diagram showing an overall configuration including prediction system 1 in a variation of the embodiment. In an example shown in FIG. 7, server 4 incorporates prediction system 1. In other words, server 4 includes prediction system 1. In the example shown in FIG. 7, washer 2 further includes communicator 27 and storage 28.

For example, communicator 27 communicates with server 4 via external network NT1 such as the Internet. The communication between communicator 27 and server 4 may be wireless communication or wired communication. The standards of the communication between communicator 27 and server 4 are not particularly limited.

Storage 28 is a storage device which stores information (such as computer programs) necessary for performing various types of functions by functionalizer 21. Although storage 28 is realized by, for example, a semiconductor memory, storage 28 is not particularly limited, and a known means for electronic information storage can be used. Storage 28 stores, for example, the history information of the washing operation and the drying operation, the history information of the results of detection of sensors 24, and the like. In other words, storage 28 stores data related to washer 2 in data stored in storage 17 of prediction system 1.

For example, server 4 is installed in a remote location away from a facility where washer 2 is installed, and is formed to be able to communicate with washer 2 via external network NT1. In other words, prediction system 1 communicates with washer 2 via external network NT1. Hence, in the present variation, in server 4, prediction system 1 transmits and receives data to and from washer 2 via external network NT1 to achieve the functions of the individual units.

In the embodiment described above, one or more sensors 24 may include a humidity sensor which measures the humidity (relative humidity) of washing tub 25. In this case, predictor 12 may further reference, as a parameter for the drying operation, the humidity of washing tub 25 in addition to the suction temperature and the discharge temperature so as to predict the drying time. In this case, the further enhancement of the accuracy of the prediction of the drying time can be expected.

In the embodiment described above, by whether a chronological change pattern of parameters for the drying operation in a certain period of time is included in the history, whether the first prediction method performed by predictor 12 is applicable after the restart of the drying operation may be determined. By whether a typical value (such as an average value, a mode value, or a median value) of parameters for the drying operation in a certain period of time is included in the history, whether the first prediction method performed by predictor 12 is applicable after the restart of the drying operation may also be determined.

Although in the embodiment described above, determiner 14 compares the history of the parameters before the drying operation is temporarily stopped with the parameters when the drying operation is restarted, and thereby determines whether the first prediction method performed by predictor 12 is applicable, the present disclosure is not limited to this configuration. For example, determiner 14 may calculate, based on the result of detection of detector 13, a stop time which is required until the restart after the drying operation is temporarily stopped. Then, determiner 14 may compare the calculated stop time with a predetermined time, and thus when the stop time is less than the predetermined time, determiner 14 may determine that the first prediction method performed by predictor 12 is applicable and when the stop time is greater than or equal to the predetermined time, determiner 14 may determine that the first prediction method performed by predictor 12 is not applicable. This is because when the stop time is short, the internal environment of washing tub 25 is unlikely to be greatly changed as compared with the internal environment when the drying operation is temporarily stopped.

Although in the embodiment, the drying operation is temporarily stopped based on an input made by the user for providing an instruction to temporarily stop the drying operation, the present disclosure is not limited to this configuration. For example, the drying operation can be temporarily stopped when the operation of washer 2 is stopped by an instantaneous power failure. In order to cope with such a case, detector 13 may further monitor the status of the power of washer 2 to detect whether the drying operation is temporarily stopped and is restarted.

Although in the embodiment described above, prediction system 1 (prediction method) includes detector 13 (detection step ST3), the present disclosure is not limited to this configuration. For example, prediction system 1 (prediction method) preferably can detect the restart of the drying operation in determiner 14 (determination step ST4), and does not need to detect the stop of the operation during the drying operation.

Although in the embodiment described above, prediction system 1 is targeted for drying function-equipped washer 2, the present disclosure is not limited to this configuration. For example, prediction system 1 may be targeted for a dryer such as a bathroom dryer which is not equipped with a washing function. In this case, in the embodiment described above, "drying function-equipped washer 2 (or washer 2)" is preferably replaced by a "dryer".

For example, although in the embodiment described above, prediction system 1 is realized as a single device, prediction system 1 may be realized by a plurality of devices. When prediction system 1 is realized by a plurality of devices, there is no limitation on how constituent elements included in prediction system 1 are allocated to the devices. In other words, the present disclosure may be realized by cloud computing or may be realized by edge computing.

For example, in the embodiment described above, all or part of the constituent elements of prediction system 1 in the present disclosure may be formed by dedicated hardware or may be realized by executing a software program suitable for each of the constituent elements. A program executor such as a central processing unit (CPU) or a processor may read and execute a software program recorded in a recording medium such as a hard disk drive (HDD) or a semiconductor memory so as to realize each of the constituent elements.

The constituent elements of prediction system 1 in the present disclosure may be formed with one or a plurality of electronic circuits. The one or a plurality of electronic circuits each may be a general-purpose circuit or a dedicated circuit.

In the one or a plurality of electronic circuits, for example, a semiconductor device, an integrated circuit (IC), a large scale integration (LSI) circuit, or the like may be included. The IC or the LSI circuit may be integrated into one chip or may be integrated into a plurality of chips. Although the circuit is referred to as the IC or the LSI circuit here, how the circuit is referred to is changed depending on the degree of integration, and the circuit may be referred to as a system LSI circuit, a very large scale integration (VLSI) circuit, or an ultra large scale integration (ULSI) circuit. A field programmable gate array (FPGA), which is programmed after the manufacturing of its LSI circuit, can be used for the same purpose.

The general or specific aspects of the present disclosure may be realized by a system, a device, a method, an integrated circuit, or a computer program. The general or specific aspects may also be realized by a non-transitory computer-readable recording medium such as an optical disc, a HDD, or a semiconductor memory in which the computer program is stored. For example, the present disclosure may be realized as a program for causing a computer to execute the control method in the embodiment described above. The program may be recorded in a non-transitory computer-readable recording medium such as a CD-ROM or may be distributed via a communication path such as the Internet.

As described above, as an example of the technology in the present disclosure, the embodiment has been described.

For this purpose, the accompanying drawings and the detailed description are provided.

Hence, constituent elements provided in the accompanying drawings and the detailed description can include not only constituent elements which are essential for solving the problem but also constituent elements which are intended for illustrating the technology and are not essential for solving the problem. Therefore, it should not be assumed that since the constituent elements which are not essential are provided in the accompanying drawings and the detailed description, the constituent elements which are not essential are essential.

Since the embodiment described above is intended for illustrating the technology in the present disclosure, it is possible to perform various types of change, replacement, addition, omission, and the like in the scope of claims or in a scope equivalent thereto.

CONCLUSIONS

As described above, the prediction method in the embodiment includes acquisition step ST1, prediction step ST2, determination step ST4, and processing step ST5. In acquisition step ST1, the parameters for the drying operation performed by drying function-equipped washer 2 are acquired. In prediction step ST2, based on the parameters acquired in acquisition step ST1, the drying time required for the drying operation is predicted by the first prediction method. In determination step ST4, when the restart of the drying operation is detected while the drying operation is stopped, whether the first prediction method performed in prediction step ST2 is applicable is determined. In processing step ST5, when the first prediction method is determined to be applicable, the first prediction method is continued and when the first prediction method is determined not to be applicable, the predetermined processing is performed.

In this way, even when the drying operation is stopped during operation, as compared with the case where, when the drying operation is restarted, the normal function of predicting the drying time is restarted without exception or is stopped without exception, it is advantageous to easily continue the normal method for predicting the drying time.

For example, in determination step ST4, whether the first prediction method is applicable is determined based on whether the history of the parameters before the drying operation is stopped includes parameters that are similar to the parameters for the restart of the drying operation.

In this way, it is advantageous to easily determine, by relatively simple processing for referencing the internal environment of washing tub 25, whether the normal method for predicting the drying time performed in prediction step ST2 is applicable after the restart of the drying operation.

For example, drying function-equipped washer 2 includes the function of using heat pump 26 to perform the drying operation. The parameters include the temperature of air sucked from washing tub 25 of drying function-equipped washer 2 into heat pump 26 and the temperature of air exhausted from heat pump 26 to washing tub 25.

In this way, it is advantageous to easily determine, by use of physical quantities which are relatively easy to measure, whether the normal method for predicting the drying time performed in prediction step ST2 is applicable after the restart of the drying operation.

For example, in the first prediction method, a machine-learned model for predicting the drying time is used to predict the drying time.

In this way, as compared with a case where the drying time is predicted on a rule base, it is advantageous to be able to expect the enhancement of the accuracy of the prediction of the drying time.

For example, the predetermined processing includes processing of switching from the first prediction method to the second prediction method different from the first prediction method and predicting the drying time.

In this way, as compared with a case where the function of predicting the drying time is stopped after the restart of the drying operation, it is advantageous that the user is unlikely to feel uncomfortable.

For example, the prediction method further includes presentation step ST6 for presenting, to the user, information on the result of the performance in processing step ST5.

In this way, the user can grasp what happens after the restart of the drying operation, and thus it is advantageous that the user is unlikely to feel uncomfortable.

The prediction method in the embodiment includes prediction step ST2, determination step ST4, and processing step ST5. In prediction step ST2, based on the parameters for the drying operation, the drying time required for the drying operation is predicted by the first prediction method. In determination step ST4, when the restart of the drying operation is detected while the drying operation is stopped, whether the first prediction method performed in prediction step ST2 is applicable is determined. In processing step ST5, when the first prediction method is determined to be applicable, the first prediction method is continued and when the first prediction method is determined not to be applicable, the predetermined processing is performed.

In this way, even when the drying operation is stopped during operation, as compared with the case where, when the drying operation is restarted, the normal function of predicting the drying time is restarted without exception or is stopped without exception, it is advantageous to easily continue the normal method for predicting the drying time.

The program in the embodiment causes one or more processors to execute the prediction method described above.

In this way, even when the drying operation is stopped during operation, as compared with the case where, when the drying operation is restarted, the normal function of predicting the drying time is restarted without exception or is stopped without exception, it is advantageous to easily continue the normal method for predicting the drying time.

Prediction system 1 in the embodiment includes acquirer 11, predictor 12, determiner 14, and processor 15. Acquirer 11 acquires the parameters for the drying operation performed by drying function-equipped washer 2. Predictor 12 predicts, based on the parameters acquired by acquirer 11, the drying time required for the drying operation by the first prediction method. Determiner 14 determines, when the restart of the drying operation is detected while the drying operation is stopped, whether the first prediction method performed by predictor 12 is applicable. Processor 15 continues the first prediction method when the first prediction method is determined to be applicable and performs the predetermined processing when the first prediction method is determined not to be applicable.

In this way, even when the drying operation is stopped during operation, as compared with the case where, when the drying operation is restarted, the normal function of predicting the drying time is restarted without exception or is stopped without exception, it is advantageous to easily continue the normal method for predicting the drying time.

The server in the embodiment includes prediction system 1 described above. Prediction system 1 communicates with drying function-equipped washer 2 via external network NT1.

In this way, even when the drying operation is stopped during operation, as compared with the case where, when the drying operation is restarted, the normal function of predicting the drying time is restarted without exception or is stopped without exception, it is advantageous to easily continue the normal method for predicting the drying time.

The display device in the embodiment includes a communication function and a display function. The communication function is a function of communicating with prediction system 1. The display function is a function of displaying, when using the communication function to receive, from prediction system 1, information on the result of the performance by processor 15, the information to present the information to the user.

The display device described here is, for example, display 23 in drying function-equipped washer 2 or the display in information terminal 3. The display device is also a display in a dryer.

INDUSTRIAL APPLICABILITY

The present disclosure can be applied to a drying function-equipped washer which has the function of performing a drying operation and the like.

The invention claimed is:

1. A prediction method comprising:
   acquiring, from a sensor of a drying function-equipped washer, parameters for a drying operation performed by the drying function-equipped washer;
   predicting, by a processor and using a first prediction method, a drying time required for the drying operation based on the parameters acquired in the acquiring;
   displaying, on a display of the drying function-equipped washer, the drying time required for the drying operation;
   determining, by the processor, when a restart of the drying operation is detected while the drying operation is stopped, whether the first prediction method performed in the predicting is applicable;
   continuing, by the processor, the first prediction method after determining that the first prediction method is applicable; and
   after determining that the first prediction method is not applicable;
      switching, by the processor, a prediction method from the first prediction method to a second prediction method, and re-predicting an updated drying time required for the drying operation based on the parameters; and
      updating, on the display, the drying time previously displayed with the updated drying time required for the drying operation.

2. The prediction method according to claim 1,
   wherein in the determining, whether the first prediction method is applicable is determined, by the processor, based on whether a history of the parameters before the drying operation is stopped includes parameters that are similar to the parameters for the restart of the drying operation.

3. The prediction method according to claim 1,
   wherein the drying function-equipped washer includes a function of using a heat pump to perform the drying operation, and
   the parameters include a temperature of air sucked from a washing tub of the drying function-equipped washer into the heat pump and a temperature of air exhausted from the heat pump to the washing tub.

4. The prediction method according to claim 1,
   wherein in the first prediction method, a machine-learned model for predicting the drying time is used to predict the drying time.

5. The prediction method according to claim 1, further comprising:
   presenting, on the display and to a user, information on a result of whether the first prediction method is continued or the second prediction method is performed.

6. A prediction method comprising:
   predicting, by a processor and using a first prediction method, a drying time required for a drying operation based on parameters for the drying operation;
   outputting, by the processor, a signal for displaying the drying time required for the drying operation;
   determining, by the processor, when a restart of the drying operation is detected while the drying operation is stopped, whether the first prediction method performed in the predicting is applicable;
   continuing, by the processor, the first prediction method after determining that the first prediction method is determined to be applicable; and
   after determining that the first prediction method is determined not to be applicable:
      switching, by the processor, a prediction method from the first prediction method to a second prediction method, and re-predicting an updated drying time required for the drying operation based on the parameters; and
      re-outputting, by the processor, an updating signal for displaying the updated drying time required for the drying operation.

7. A non-transitory computer-readable recording medium having a program recorded thereon for causing one or more processors to execute the prediction method according to claim 1.

8. A prediction system comprising:
   one or more memories; and
   at least one processor each coupled to at least one of the one or more memories and configured to perform operations comprising:
   acquiring parameters for a drying operation performed by a drying function-equipped washer, from a sensor of the drying function-equipped washer;
   predicting, by a first prediction method, a drying time required for the drying operation based on the parameters acquired by the acquirer;
   causing a display to display the drying time required for the drying operation;
   determining, when a restart of the drying operation is detected while the drying operation is stopped, whether the first prediction method performed by the predictor is applicable;
   continuing the first prediction method when the first prediction method is determined to be applicable; and
   when the first prediction method is determined not to be applicable:
      switching a prediction method from the first prediction method to a second prediction method, and re-predicting an updated drying time required for the drying operation based on the parameters; and updating, on the display, the drying time previously displayed with the updated drying time required for the drying operation.

9. A server comprising:

the prediction system according to claim 8, wherein the prediction system communicates with the drying function-equipped washer via an external network.

10. A remote display device comprising:

a communication function of communicating with the prediction system according to claim 8; and a display function of displaying, when receiving, using the communication function, information on a result of execution by the processor from the prediction system, the information to present the information to a user.

11. The prediction method according to claim 1, wherein in the first prediction method, a machine-learned model for predicting the drying time is used to predict the drying time, and in the second prediction method, a rule-based prediction method for predicting the drying time is used to predict the updated drying time.

12. The prediction method according to claim 6, wherein in the first prediction method, a machine-learned model for predicting the drying time is used to predict the drying time, and in the second prediction method, a rule-based prediction method for predicting the drying time is used to predict the updated drying time.

13. The prediction system according to claim 8, wherein in the first prediction method, a machine-learned model for predicting the drying time is used to predict the drying time, and in the second prediction method, a rule-based prediction method for predicting the drying time is used to predict the updated drying time.

\* \* \* \* \*